(12) United States Patent
Li et al.

(10) Patent No.: US 6,473,143 B2
(45) Date of Patent: Oct. 29, 2002

(54) BROADBAND SWITCHABLE POLARIZER

(75) Inventors: Jian-feng Li; Le Li, both of Yorktown Heights; Bunsen Fan, Peekskill, all of NY (US); Yingqiu Jiang, Sunnyvale, CA (US); Sadeg Faris, Pleasantville, NY (US)

(73) Assignee: Reveo, Inc., Elmsford, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/093,017

(22) Filed: Jun. 5, 1998

(65) Prior Publication Data

US 2002/0039156 A1 Apr. 4, 2002

Related U.S. Application Data

(60) Continuation-in-part of application No. 09/039,303, filed on Mar. 14, 1998, now abandoned, which is a continuation-in-part of application No. 09/039,297, filed on Mar. 14, 1998, now Pat. No. 6,072,549, which is a continuation-in-part of application No. 08/805,603, filed on Feb. 26, 1997, now Pat. No. 5,940,150, which is a continuation-in-part of application No. 08/787,282, filed on Jan. 24, 1997, which is a division of application No. 08/743,293, filed on Nov. 4, 1996, now Pat. No. 6,133,980, which is a continuation-in-part of application No. 08/739,467, filed on Oct. 29, 1996, now Pat. No. 6,034,753, which is a division of application No. 08/715,314, filed on Sep. 16, 1996, now Pat. No. 6,188,460, which is a continuation-in-part of application No. 08/550,022, filed on Oct. 30, 1995, now Pat. No. 5,691,789, which is a continuation of application No. 08/265,949, filed on Jun. 27, 1994, now Pat. No. 5,599,412, which is a division of application No. 07/798,881, filed on Nov. 27, 1991, now Pat. No. 5,364,557.

(51) Int. Cl.$^7$ .................. G02F 1/1333; C09K 19/02
(52) U.S. Cl. ................................. 349/88; 349/185
(58) Field of Search ............... 349/88, 185, 86, 349/96, 112, 113

(56) References Cited

U.S. PATENT DOCUMENTS

| 5,498,450 A | * | 3/1996 | Akashi et al. .............. 359/246 |
| 5,686,979 A | * | 11/1997 | Weber et al. ................. 349/96 |
| 6,072,549 A | * | 6/2000 | Faris et al. .................... 349/16 |

FOREIGN PATENT DOCUMENTS

| JP | 63-287924 | * 11/1988 |
| JP | 4-353831 | * 12/1992 |
| JP | 5-88209 | * 4/1993 |

\* cited by examiner

Primary Examiner—William L. Sikes
Assistant Examiner—Dung Nguyen
(74) Attorney, Agent, or Firm—Rodney T. Hodgson; Ralph J. Crispino

(57) ABSTRACT

A light controlling film is disclosed, comprising a polymerized polymer network varying spatially in a direction normal to the film surface, where the polymerized polymer network is a crosslinked high molecular weight polymeric material mixed with a low molecular weight nematic material exibiting cholesteric liquid crystal (CLC) order, wherein wherein an electric field impressed in the film controls the reflection of circularly polarized light.

20 Claims, 6 Drawing Sheets

BROADBAND SWITCHABLE POLARIZER

RELATED CASES

This is a Continuation-in-part of application Ser. No. 09/039,303 entitled "Multilayer films having non linear spacing of layers", by Sadeg Faris filed Mar. 14, 1998, now abandoned and of application Ser. No. 09/039,297 entitled ""Intelligent" Glazing Structures with Additional Control Layers" by Sadeg Faris and Le Li filed Mar. 14, 1998 now U.S. Pat. No. 6,072,549, which are Continuations-in-part of application Ser. No. 08/805,603 entitled "Electro-optical glazing structures having total-reflection and transparent modes of operation for use in dynamical control of electromagnetic radiation" by Sadeg M. Faris and Le Li, filed Feb. 26, 1997 now U.S. Pat. No. 5,940,150, which is a continuation-in-part of: application Ser. No. 08/739,467 entitled "Super Broadband Reflective Circularly Polarizing Material And Method Of Fabricating And Using Same In Diverse Applications", by Sadeg M. Faris and Le Li filed Oct. 29, 1996 now U.S. Pat. No. 6,034,753, which is a Continuation-in-Part of application Ser. No. 08/550,022 (Now U.S. Pat. No. 5,691,789) entitled "Single Layer Reflective Super Broadband Circular Polarizer and Method of Fabrication Therefor" by Sadeg M. Faris and Le Li filed Oct. 30, 1995; application Ser. No. 08/787,282 entitled "Cholesteric Liquid Crystal Inks" by Sadeg M. Faris filed Jan. 24, 1997, which is a Continuation of application Ser. No. 08/265,949 filed Jun. 27, 1994 now U.S. Pat. No. 5,599,412, which is a Divisional of application Ser. No. 07/798,881 entitled "Cholesteric Liquid Crystal Inks" by Sadeg M. Faris filed Nov. 27, 1991, now U.S. Pat. No. 5,364,557; application Ser. No. 08/715,314 entitled "High-Brightness Color Liquid Crystal Display Panel Employing Systemic Light Recycling And Methods And Apparatus For Manufacturing The Same" by Sadeg Faris filed Sep. 16, 1996 now U.S. Pat. No. 6,188,460; and application Ser. No. 08/743,293 entitled "Liquid Crystal Film Structures With Phase-Retardation Surface Regions Formed Therein And Methods Of Fabricating The Same" by Sadeg Faris filed Nov. 4, 1996 now U.S. Pat. No. 6,133,980; and an application submitted simultaneously with the present application entitled CONTROLLABLE BANDWIDTH POLARIZER by Bunsen Fan, Jian-feng Li, Le Li, and Sadeg M. Faris; each said Application being commonly owned by Reveo, Inc, and incorporated herein by reference in its entirety.

BACKGROUND OF THE INVENTION

1. Field of Invention

The present invention relates generally to reflective film to reflective polarizing films where the polarized reflectivity may be varied by impressing an electric field across the film. The pitch of the liquid Cholesteric order varies non-linearly throughout the thickness of the film to produce a very broad band reflective film. Such films may be used to great advantage in electro-optical glazing structures having reflection, semi-transparent, and transparent modes of operation which are electrically-switchable for use in dynamically controlling electromagnetic radiation flow in diverse applications.

2. Brief Description of the Literature

Broadband reflecting polarizers were introduced in application Ser. No. 08/550,022 (now U.S. Pat. No. 5,691,789) entitled "Single Layer Reflective Super Broadband Circular Polarizer and Method of Fabrication Therefor" by Sadeg M. Faris and Le Li which was filed Oct. 30, 1995. Such broadband polarizers are made by producing a single layer having cholesteric liquid crystal order where the pitch of the liquid crystal order varies in a non linear fashion across the layer. A narrow band, switchable polarizing single layer reflector is disclosed in European patent application 0 643 121 A, published Mar. 15, 1995. A switchable polarizing single layer reflector having a broader bandwidth is disclosed in PCT application WO97/2358, published Jul. 3, 1997. General references on polymer dispersed liquid crystals may be found in detail in "Polymer Dispersed Liquid crystal displays", by J. W. Doane, a chapter in "Liquid Crystals", Ed. B. Bahadur, World Scientific Publishing, Singapore, and "CLC/polymer dispersion for haze-free light shutters, by D. Yang et al. Appl. Phys. Lett. 60, 3102 (1992). Smart Window Design is treated in "Electrochromism and smart window design", by C. Granqvist, Solid State Ionics 53–56 (1992) and "large scale electrochromic devices for smart windows and absorbers", by T. Meisel and R. Baraun, SPIE 1728, 200 (1992). The above identified US patents and other references are hereby incorporated by reference.

OBJECTS OF THE PRESENT INVENTION

It is an object of the invention to provide a single layer polarizing film having a very wide bandwidth which is switchable.

It is an object of the invention to provide a switchable reflecting polarizing filter having a very wide bandwidth which is controllable by an electric field.

It is an object of the invention to provide a switchable reflective film having little variation in the reflectivity outside of the reflective bandwidth of the film.

It is an object of the invention to provide a "smart window" using a polarizing reflective film having a very wide bandwidth.

It is an object of the invention to provide a "smart window" using a polarizing reflective film having a very wide bandwidth combined with a reflective multilayer polymer film having a very wide bandwidth.

It is an object of the invention to provide a "smart window" using a polarizing reflective film having a very wide bandwidth combined with a reflective multilayer polymer film having little variation in the reflectivity outside of the reflective bandwidth of the film.

It is an object of the invention to provide a "smart window" using a polarizing reflective multilayer polymer film having a very wide bandwidth combined with a light scattering layer for further control of transmitted light.

SUMMARY OF THE PRESENT INVENTION

The present invention provides a single layer polarizing reflective film comprising a cross linked polymer matrix mixed with low molecular weight liquid crystal molecules. The liquid crystal molecules are oriented with respect to the surface of the film and to each other in cholesteric order, and the pitch of the cholesteric order varies non-linearly across the thickness of the film so that the film reflects circularly polarized light having a broad bandwidth. The ratio of the amount of liquid crystal molecules to the amount of cross-linked polymer is chosen so that the liquid crystal molecules may rotate reversibly in an electric field, and hence destroy the liquid crystalline order responsible for the reflectivity of the polarized light. There is sufficient high molecular weight cross linked polymer material to ensure that the film is not liquid, and to ensure that the low molecular weight material does not diffuse after manufacture of the film, and to ensure that the low molecular weight material returns to the cholesteric ordered state when the field is removed.

DETAILED DESCRIPTION OF THE PRESENT INVENTION

Figure 1:
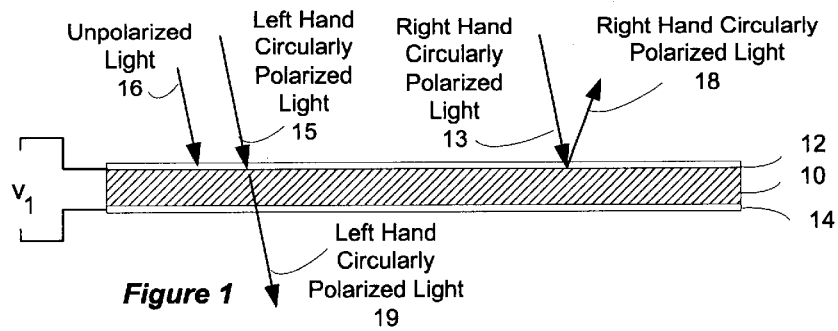
FIG. 1 shows the film 10 of the invention.

Since the early attempt of utilizing cholesteric film as optical filter and the effort on polymer encapsulated nematic liquid crystals for display, much attention has been focused on trying to bring polymeric liquid crystals and cholesteric liquid crystals together to make devices for light control application. (See, for example J. Adams, W. Hass, J. Dailey, Journal of Applied Physics, 1971, and J. L. Fergason, Society for Information Display Digest, 1985.). We report new polarizers made from a high molecular weight reactive cholesteric liquid crystal polymer material mixed with conventional low molecular weight liquid crystal(s) and a chiral dopant(s). The resulting polarizers reflect circular polarized light matching their spiral senses. A 10 micrometer thick polarizer, with a bandwidth from 440 nm to 660 nm, can be switched from reflection mode to transmission mode by applying an electric field.

Using a material blend containing a reactive cholesteric liquid crystalline (CLC) compound, other non-reactive liquid crystal(s) and chiral dopant(s), the switchable polarizer is created by a mechanism termed as ultraviolet (UV) polymerization induced molecular redistribution (PIMRD) which is responsible for creating a nonlinear helical pitch distribution along the CLC helical axis. This redistribution is described in great detail in Le Li and Sadeg M. Faris, Single Layer Reflective Super Broadband Circular Polarizer And Method of Fabrication Therefor, U.S. Pat. No. 5,691,789, (1997). Cross linking or polymerization of the high molecular weight molecules takes place at different rates in different places in the material, and the non-reactive compounds are pushed out from the more cross linked or polymerized material and segregated as reported in an article by Yang, D. K., Chien, L.-C., and Doane, J. W., Appl. Phys. Lett. 60, p3102 (1992). As a result, some diffusing non-reactive molecules are "trapped" in the polymer network during the polymerization. At sites where more non-reactive nematic liquid crystalline molecules are accumulated, the polymerization rate is lower, and the helical pitch become longer. Ultimately, this PIMRD mechanism yields a non-uniform helical pitch distribution throughout the mixture, resulting in a switchable broadband reflective polarizer.

The non linear pitch distribution may be attained by polymerizing with light, where the intensity of the light varies throughout the layer of material. This happens naturally if the material mixture absorbs the light strongly. The mixture is merely irradiated at a low enough intensity to allow diffusion of the non-reactive nematic liquid crystalline molecules from one surface of the mixture to the other. Appropriate light absorbing molecules may be added to the mixture, or a wavelength of the light may be chosen which is strongly absorbed in one of the constituents of the mixture which is necessary for the function of the broad band polarizer. Other methods of polymerization as known in the art may be used as well, so long as the requisite non linear light absorption results. Such methods as electron or other beam irradiation, or heating with a large temperature gradient across the material, could also be used.

When the reactive HMW material has been cross linked or polymerized, the high molecular weight (HMW) polymer material forms a matrix holding the low molecular weight (LMW) liquid crystal material. The high molecular weight polymer material is preferably itself a cholesteric liquid crystal (CLC) material, but it is not necessarily so. The main function of the high molecular weight material is to form the matrix which stabilizes the low molecular weight material. The low molecular weight material is aligned with respect to the surface, and has CLC order before polymerization and retains the order after polymerization. After polymerization, an electric field in the material may rotate the low molecular weight molecules if the density of the cross linking is low enough, and the CLC order will be changed or disrupted. When the electric field is removed, the polymer material acts somewhat like a spring to return the low molecular weight molecules to the original position, restoring the CLC order and the polarized reflectivity. If too little polymer is used, the material will be too liquid and the low molecular weight molecules may diffuse and reduce the non linearity of the pitch distribution, which would result in a narrow band polarizer. If too much polymer is used, the low molecular weight materials will no longer be able to rotate, and the material will not be switchable except under extremely high fields.

As an example, a switchable polarizer has been obtained from samples of a liquid crystal mixture made from a first recipe consisting of 1.9% by weight of a high molecular weight (HMW) CLC polymer CC4039R obtained from Wacker chemical, 96.6% of a low molecular weight (LMW) nematic material E7 from EMI chemical, 0.05% of a photointiator IG 184 obtained from Ciba Geigy, 0.59% of a chiral additive S1011 from EMI, and 0.82% of another chiral additive CB15 from EMI. In samples made according to this recipe, the intrinsic polarizing bandwidth before polymerization was estimated to be 60 nm. After being polymerized at room temperature by a UV intensity of 0.72 mW/cm$^2$, the bandwidth was increased to 120 nm. When no electric field is applied, the polarizer exhibits a high reflectivity to the right handed circularly polarized light within a bandwidth of 120 nm. However, it is not reactive to the left-handed circularly polarized light. If a sufficient electric field was applied, the reflectivity drops to almost zero and passes all polarizations of light.

To further enhance the performance of the switchable broadband polarizer, in terms of polarizing bandwidth, switchability and efficiency, extensive material research has been carried out to develop a special reflective polarizer whose reflectivity as well as the polarizability can be switched back and forth via an electric field. Different liquid crystal polymer materials have been tried for mixing with the low molecular weight nematic E44 from EMI, chiral additives, and photo initiator, according to different ratios. Ultimately, two kinds of single layer switchable reflective polarizers have been created through this program. They are made from a reactive cholesteric HMW liquid crystalline compound (BASF) mixed with a non-reactive LMW nematic liquid crystal compound and certain amount of chiral dopant.

The two types of switchable broadband reflective polarizers feature a single thin film configuration. The new polarizers are made from a reactive HMW cholesteric liquid crystal polymer mixed with conventional low molecular weight liquid crystal molecules and a chiral dopant(s). The resulting polarizers reflect circular polarized light matching their spiral senses. When in the polarizing state, they exhibit a contrast ratio higher than 10:1 and a bandwidth greater than 220 nm in the visible region.

The first type of broadband switchable polarizer is featured in this application. When no electrical field is applied, the polarizer exhibits a broadband polarizing reflective state in the visible from 440 nm to 660 nm. This polarizer can be switched from the polarizing reflection mode to a transmission mode by applying an AC or DC electric field. The second type of controllable bandwidth polarizer which is the subject of a second application filed on the same date as the present application entitled CONTROLLABLE BANDWIDTH POLARIZER with Inventors Bunsen Fan, Jianfeng Li, Le Li, and Sadeg M. Faris, and having as assignee the assignee of the present application, exhibits a narrow band (70 nm) polarizing reflective state in the red spectral region when no electric field applied. However, when a low frequency or DC electric field is applied, this narrow band polarizer becomes a broadband reflective polarizer. Its bandwidth is extended to 350 nm with an averaged reflectivity no less than 40%.

In this case of the present application broad band switchable polarizer, the switchable polarizer is created by the same PIRMD mechanism from a material blend containing a reactive cholesteric liquid crystalline (CLC) compound, other non-reactive liquid crystal(s) and chiral dopant(s).

The following recipes use special right-handed reactive HMW cholesteric liquid crystalline compounds with a commercial nematic liquid crystal and certain amount of chiral dopant. The purpose of adding chiral dopant is to adjust the helical pitch. Photo-initiator was also added to start the polymerzation process. Details of a number of recipes follow:

Second recipe: 15% CM170*(504 nm)(BASF), 28% CB15 (EMI), 55% E44(EMI), 2% IG184(Ciba Geigy). Cell thickness d=8 m, curing temperature 35° C., UV intensity $10^{-6}$ mW/cm$^2$. Bandwidth from 422–660 nm (right-handed) when no voltage is applied. Extinction ratio 10:1, switching voltage 120V (rms) at 1000 Hz. CM170* cross-linking density is medium.

Third recipe, CM171 (544 nm) (BASF)=20%, CB15= 30%, E44=48%, IG184=2%. Cell thickness d=8 m, curing temperature 35° C., UV $10^{-6}$ mW/cm$^2$. Bandwidth from 430–640 nm (right-handed) when no voltage is applied. Extinction ratio 7:1, switching voltage 120V (rms) at 1000 Hz. CM171 cross-linking density is medium.

Forth recipe, CM171 (544 nm) (BASF)=13.6%, CB15= 20%, E44=59.8%, R1011=2.3%, R811 (EMI)=2.3%, IG184 1.9%. Cell thickness d=8 m, curing temperature 35° C., UV $10^{-6}$ mW/cm$^2$. Bandwidth from 440–620 nm (right-handed) when no voltage is applied, extinction ratio 6:1, switching voltage 120V (rms) at 1000 Hz. CM171 cross-linking density is medium Fifth recipe, CM171*(556 nm) (BASF)=13.4%, E44= 70.9%, S1011=5.9%, S811=8%, IG184 1.7%. d=8 m, curing temperature 35° C., UV 10 mW/cm$^2$. Bandwidth from 540–820 nm (left-handed) when no voltage is applied, extinction ratio 6:1, switching voltage 120V (rms) at 1000 Hz. CM171* cross-linking density is low.

Sixth recipe, CM181* (579 nm)=15%, E44=80%, S1011= 5%, S811=5%, and photoinitiator=4% IG651 photoinitiator from Ciba Geigy.

A commercial UV light source, wavelength centered at 365 nm, was used to polymerize the mixture. Spectrometry was carried out with a Perkin-Elmer Lambda 19.

The samples were made of two indium tin oxide (ITO) covered glass sheets coated with rubbed polyimide separated by glass fiber spacers and filled with liquid crystal mixture, and then irradiated with UV light at a elevated temperature.

Various embodiments of the invention may be understood by reference to the figures.

FIG. 1 shows the film 10 of the invention comprising a cross linked or polymerized material having a high molecular weight component and a low molecular weight CLC component. Film 10 is contacted by electrically conducting materials 12 and 14 which may have a voltage $V_1$ applied to impress and electric field in the material of the invention. The materials 12 and 14 may contact the film 10 or be closely adjacent film 10. Unpolarized light 16 is shown incident on film 10 through conducting material 12, which is transparent to the light 16. Unpolarized light 16 may be regarded as a mixture of right hand circularly polarized light 13 and left hand circularly polarized light 15. Right hand circularly polarized light 18 is shown reflecting from film 10, while left hand circularly polarized light is shown transmitted through film 10 and through material 14. If material 14 absorbs the left hand circularly polarized light remaining after transmission through film 10, the device of FIG. 1 is a polarizer. If light 19 is transmitted, the device of FIG. 1 is a polarizing beamsplitter. When the field is impressed in film 10 by raising the voltage $V_1$, the right hand circularly polarized light 18 disappears. If the light incident on to film 10 is right hand circularly polarized, the voltage may be used to change the device of FIG. 1 from a reflector of the light to a transmitter of the light.

Figure 2:
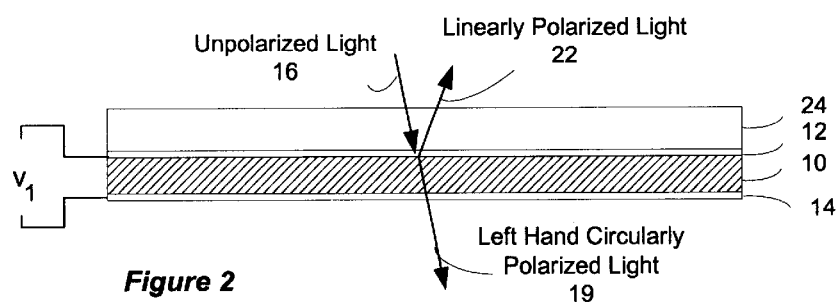
FIG. 2 shows the device of FIG. 1 with the addition of a π/4 phase retardation plate.
Figure 3:
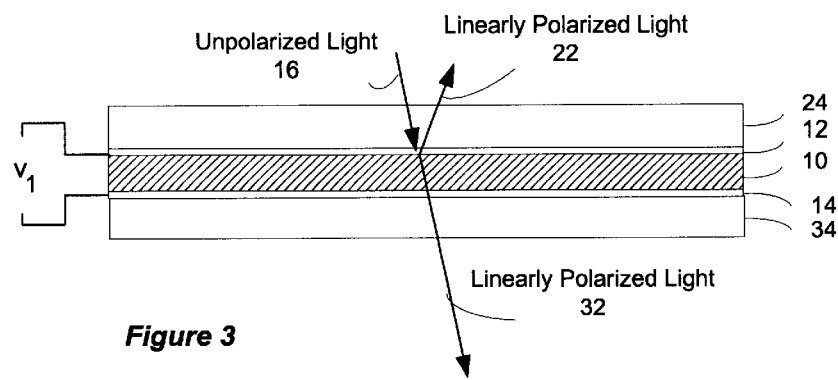
FIG. 3 shows the device of FIG. 2 with an additional π/4 phase retardation plate.

FIG. 3 shows an additional embodiment of the device of FIG. 2 whereby an additional π/4 phase retardation plate 34 converts the circularly polarized light remaining from the initially unpolarized incident light to a linearly polarized light beam 32 which has opposite polarization to the reflected beam 22.

Figure 4:
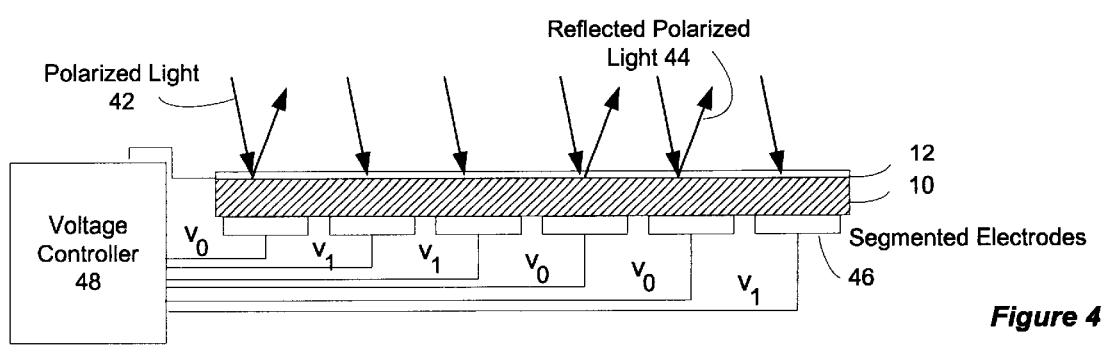
FIG. 4 shows an embodiment of the film of the invention used for display purposes.

FIG. 4 shows an embodiment of the film of the invention used for display purposes. The electric field in the film 10 of the invention is controlled to vary spatially across the area of the film 10 by a voltage controller 48 applying varying voltages to segmented electrodes 46. Light 42 is reflected or not from the various areas of the film to give a display. In the case shown, polarized light may be used for light 42, and the polarized light in transmission may also be used as a display.

Figure 5:
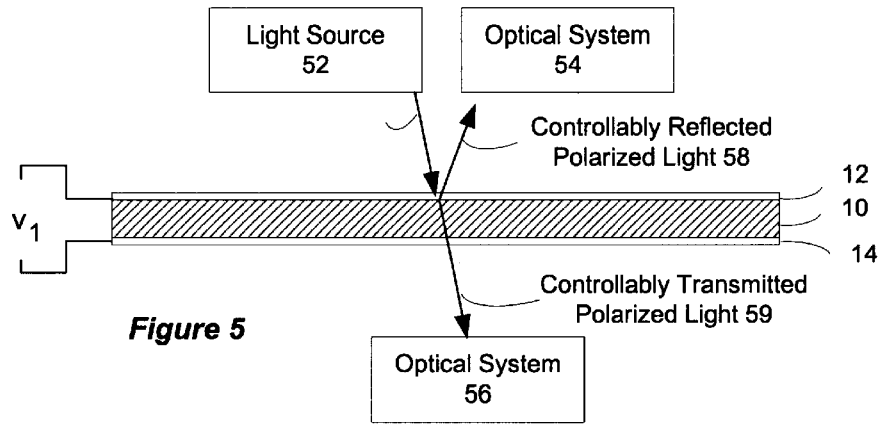
FIG. 5 shows an optical system using the film of the invention.

FIG. 5 shows an optical system using the film of the invention, whereby the switchable broadband polarized light beam 58 may be used in further optical systems 54, and the transmitted light beam 59 may be switched from polarized to unpolarized by the voltage applied across the conducting materials 10 and 12.

Figure 6:
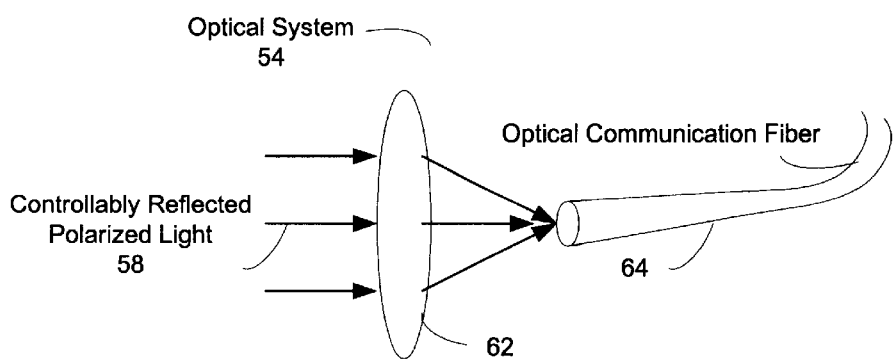
FIG. 6 shows an optical system for an optical communication fiber.

FIG. 6 shows one example of an optical system 54 for injecting a controlled polarized light beam 58 through a lens 62 into an optical communication fiber 64.

Figure 7:
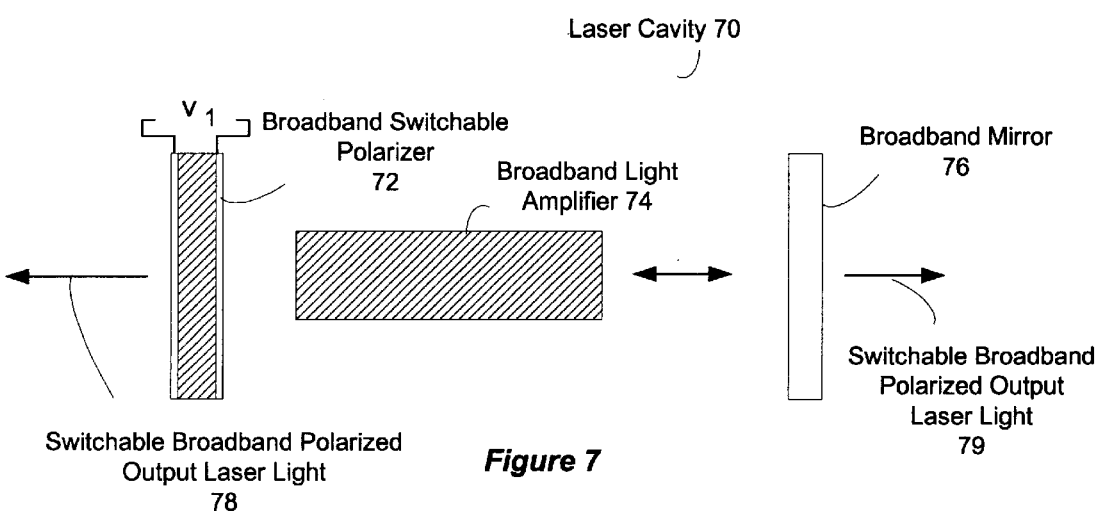
FIG. 7 shows the film of the invention as a cavity element in a laser cavity 70.

FIG. 7 an embodiment using the voltage controlled film of the invention as a cavity element in a laser cavity 70. The switchable polarizing film is used here as cavity reflector 72 for a cavity comprising the switchable polarizing film, a broadband light amplifier 74, and a broadband mirror 76. The device of FIG. 7 will lase and produce a broad bandwidth of laser light when the reflectivity of the mirror 72 reaches a threshold. The laser output may be drawn either from the mirror 72 or from the mirror 76, or both, depending on the transmissions of the cavity reflectors.

Figure 8:
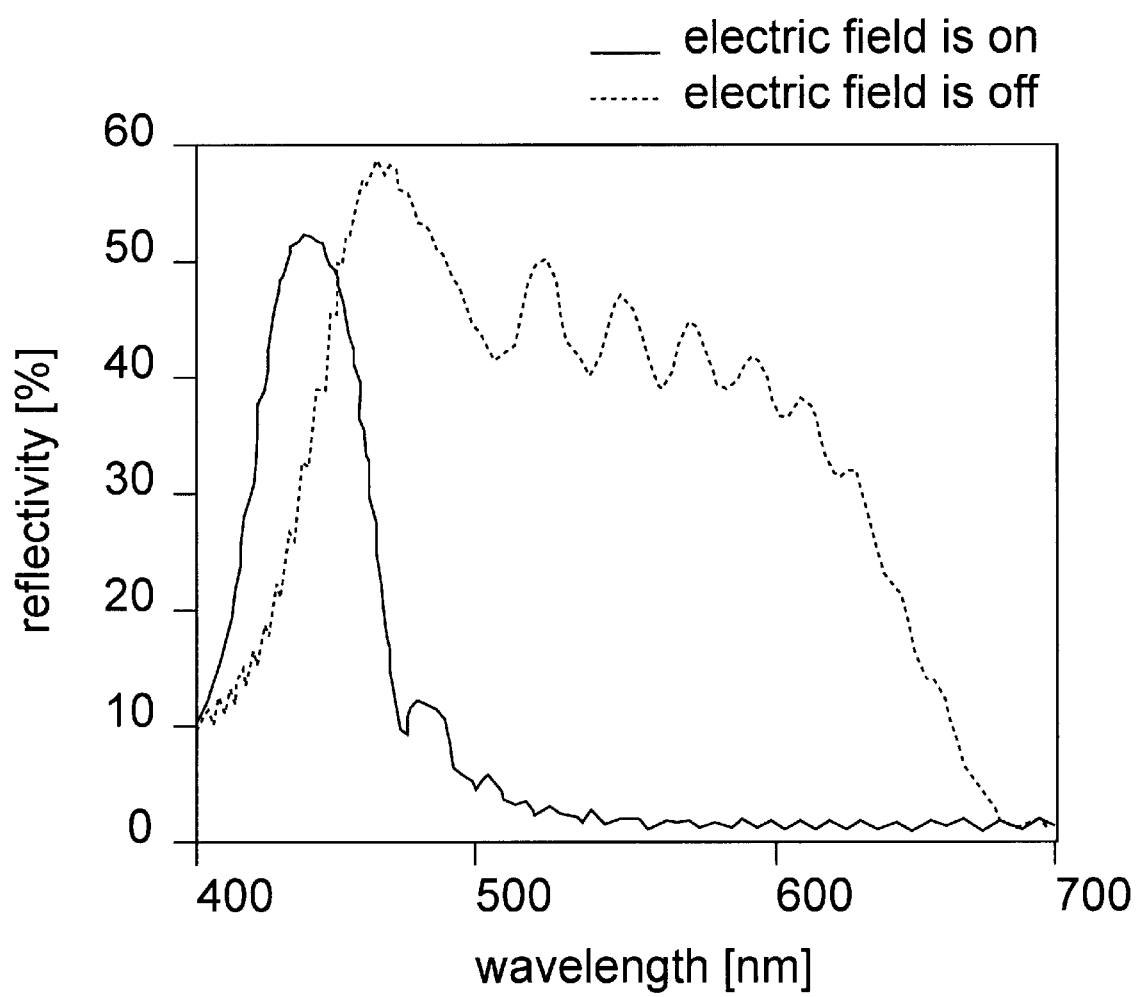
FIG. 8 shows the reflection spectrum of a typical switchable polarizer.

In FIG. 8, the reflection spectrum of a typical switchable polarizer made from recipe #2 is illustrated, which was measured with an unpolarized light source. A reflection band from 440 nm to 660 nm with average reflectivity around 45% was obtained from the unpolarized probing beam. Upon applying an AC electric field (10V/micrometer), averaged reflectivity drops dramatically to a mere 2% (after correcting for the 4% surface reflection). We believe that the reflection peak at around 440 nm, while the AC field is on, is due to the cholesteric liquid crystal polymer network which will not be disturbed by the electric field. Experimentation by one of ordinary skill in the art, using the information contained in this specification, may be used to find CLC polymer materials which will push the reflection peak into the (non visible) UV. Experimentation by one of ordinary skill in the art, using the information contained in this specification, to find non CLC polymers may also be used to reduce the remaining peak.

Figure 9:
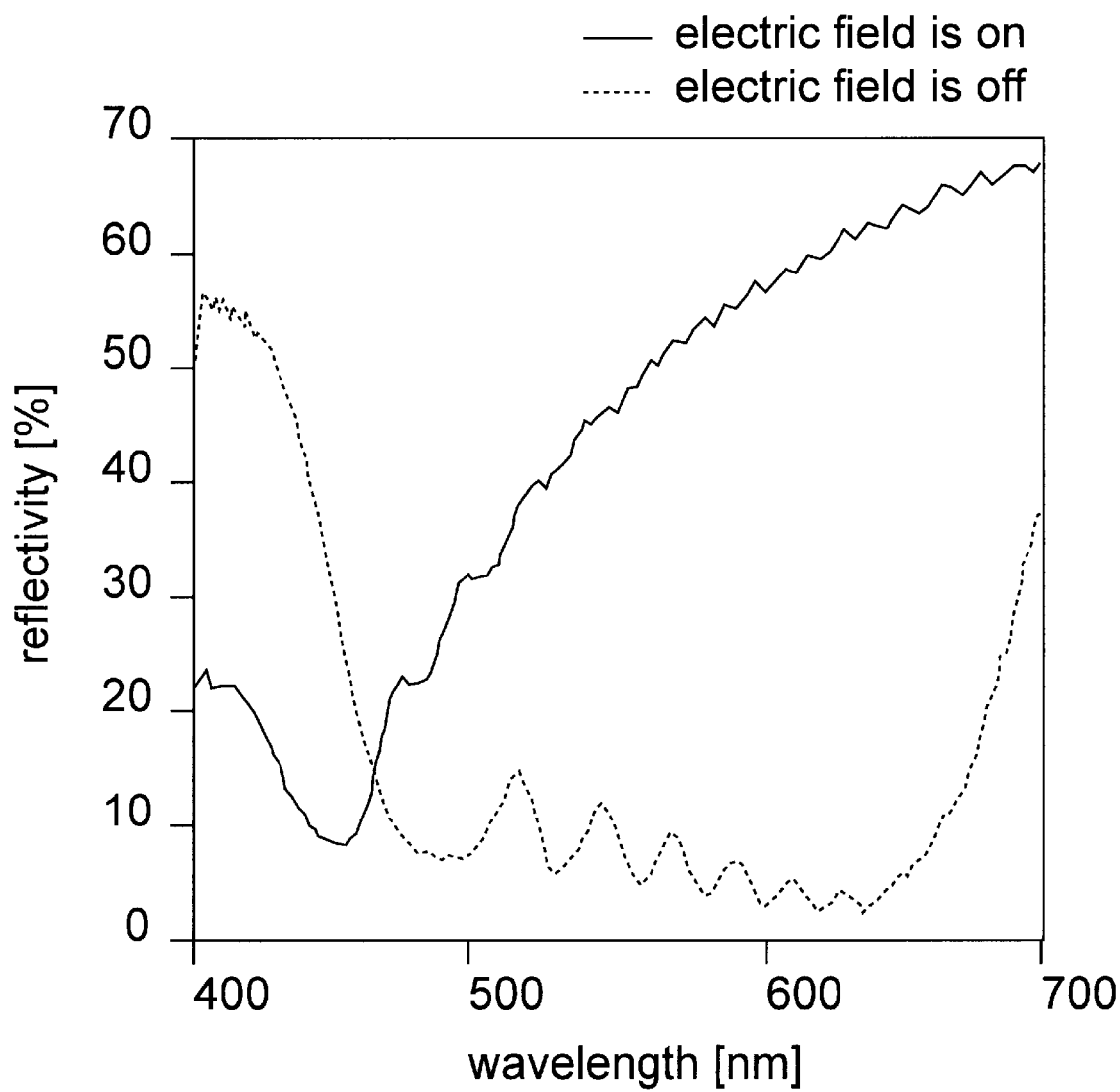
FIG. 9 presents the transmission spectrum of a sample of FIG. 8.

FIG. 9 presents the transmission spectrum of a sample made with recipe #2 with and without AC field applied to the polarizer, here the probing beam was right-handed polarized ("crossed" with the sample).

Figure 10:
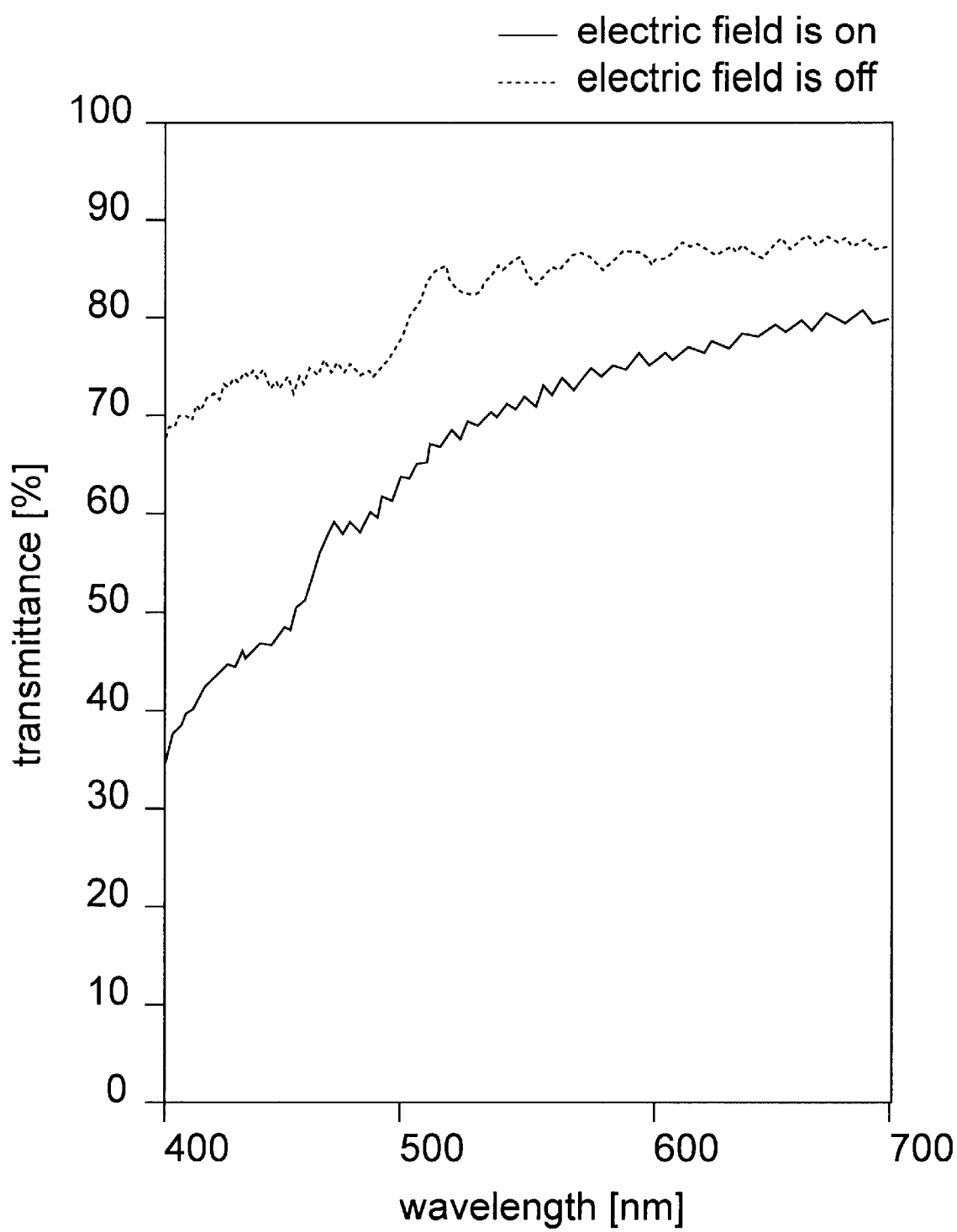
FIG. 10 shows the transmission spectrum of opposite polarization from FIG. 9.

FIG. 10 shows the transmission spectrum of a sample made with recipe #2 with the probing beam left-handed polarized ("parallel" with the sample.)

Figure 11:
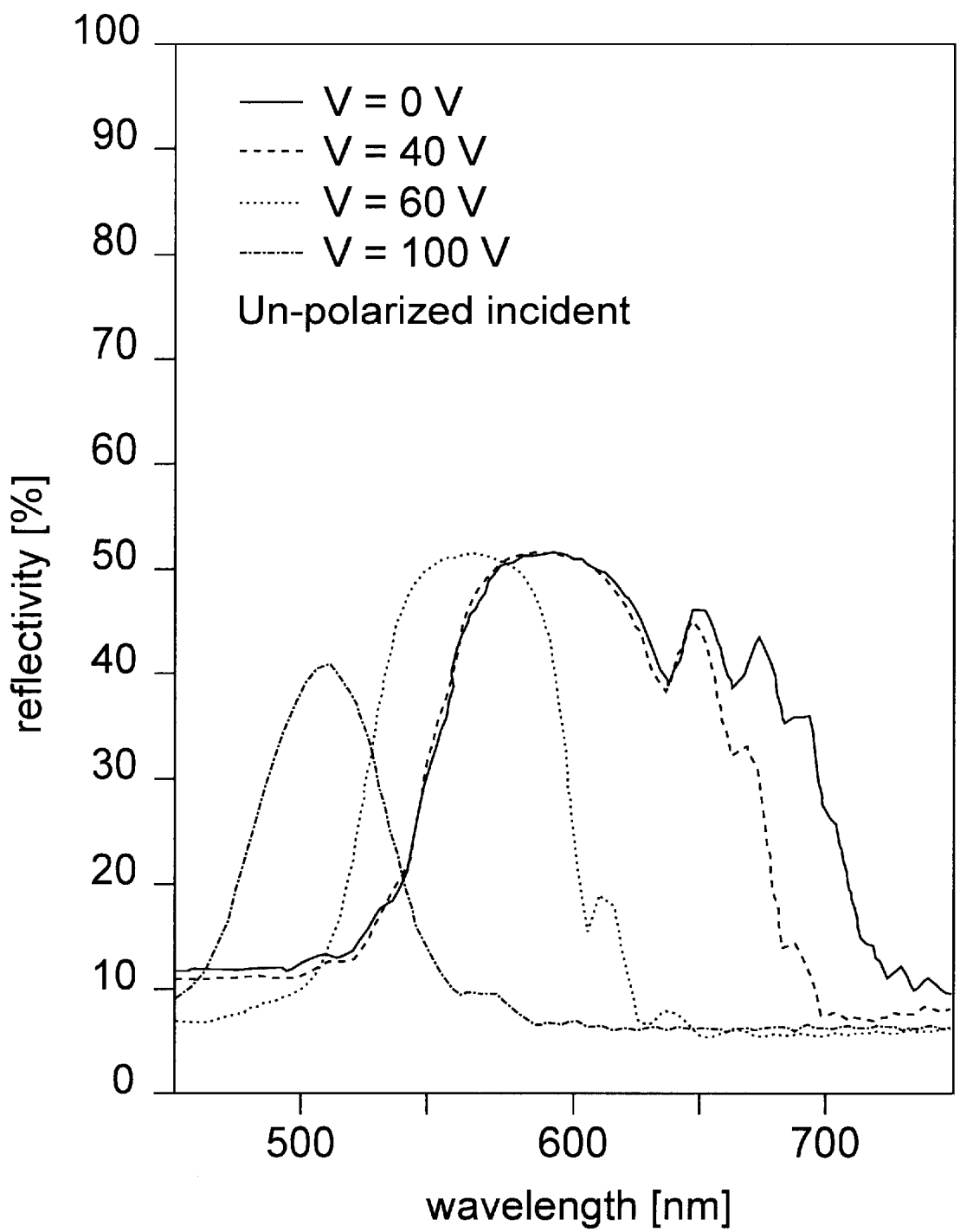
FIG. 11 shows the reflectivity of a sample for various voltages applied.

FIG. 11 shows the reflectivity in unpolarized light of a sample made from recipe #6 for various voltages applied. We surmise that the structure shown on the long wavelength side of this curve is due to defects and non-uniformities in the film, and that the long wavelength cut off of the reflectivity should be very sharp for a defect free film. The reflectivity for a specific wavelength could then be controlled by biasing the film, and a relatively small voltage added to the bias could be used to switch the film from reflecting to nonreflecting for that specific wavelength. This is of great importance to control of light by low voltage signals from inexpensive electronic apparatus. Even with the defected film shown in FIG. 11, a two volt change in applied voltage would double the reflectivity of the film for unpolarized light around 600 nm, and would change the reflectivity for the correct polarization by an even greater factor.

It should be pointed out that in all the examples, if the electric field is strong enough, the polarizers become semi-transparent. Therefore, this type of polarizer has three well distinguished optical states, i.e., narrow band polarizing state, broadband polarizing state, and non-polarizing semi-clear state, depending on the voltage applied.

We have observed that the reflectivity decreases significantly when the incident angle of the light is larger than 30°, and the light reflected starts to deviate from circularly polarized state to elliptically polarized state.

We claim:

1. A light controlling film, the film having a first surface and a second surface, comprising:
    a polymerized polymer network, the polymer network varying spatially in a direction normal to the first surface, the polymerized polymer network comprising: crosslinked high molecular weight polymeric material; and
    low molecular weight polymeric material,
    wherein the high molecular weight polymeric material and the low molecular weight polymer material form a material having cholesteric liquid crystal (CLC) order, the CLC order oriented with respect to the first and the second surfaces, the pitch of the CLC order varying non-linearly in a direction perpendicular to the first surface,
    wherein light having a first polarization and a broad bandwidth incident on the first surface is substantially reflected from the film, and wherein light having a second polarization and the broad bandwidth incident on the first surface is not substantially reflected from the film, and wherein an electric field impressed in the film controls the reflection of light having the first polarization when the electric field has a component in a direction normal to the first surface; and
    wherein the crosslinked high molecular weight polymeric material is less than 20% by weight of the film.

2. The light controlling film of claim 1, wherein the crosslinked high molecular weight polymeric material is less than 15% by weight of the film.

3. The light controlling film of claim 2, wherein the crosslinked high molecular weight polymeric material is less than 10% by weight of the film.

4. The light controlling film of claim 1, further comprising electrically conducting material adjacent to the first surface for impressing an electric field in the film, the electrically conducting material transmitting the light having the broad bandwidth and the first polarization.

5. The apparatus of claim 4, further comprising a second electrically conducting material adjacent to the second surface, wherein a voltage applied between the first and the second electrically conducting material impresses an electric field on in the film.

6. The apparatus of claim 5, wherein the second electrically conducting material transmits light having the first bandwidth.

7. The apparatus of claim 5, wherein the first polarization is a circular polarization.

8. The apparatus of claim 7, further comprising a quarter wave retardation plate transparent to light having the first bandwidth in close proximity to the first surface, whereby linearly polarized light incident on the transparent quarter wave retardation plate is controllably reflected.

9. The apparatus of claim 4, further comprising a means for applying an electric field in the film, the electric field varying spatially over the first surface, whereby polarized light is controllably reflected for display purposes.

10. The apparatus of claim 4, further comprising a means for applying an electric field in the film, the electric field having a controllable bias field and a controllable adjustment field, whereby the reflectivity of polarized light may be substantially changed by changing the controllable adjustment field.

11. The apparatus of claim 4, further comprising optical communication means, whereby the light in the optical communication means is controlled.

12. The apparatus of claim 4, further comprising means for directing light on to the first surface, and means for receiving reflected light from the first surface, whereby polarized light with a controllable bandwidth produced in the means for receiving reflected light.

13. The apparatus of claim 4, further comprising laser cavity means, whereby the output of the laser cavity means is controlled by the film when the film is used as a reflective element in the laser cavity.

14. The apparatus of claim 4, further comprising a transparent quarter wave retardation plate in close proximity to the first surface, whereby linearly polarized light incident on the transparent quarter wave retardation plate is controllably reflected.

15. A method of making a light controlling film, the film having a first surface and a second surface, comprising:

applying a mixture of high molecular weight polymeric material and low molecular weight polymeric material on a surface which produces a CLC order in the mixture; and crosslinking the high molecular weight polymeric material so that the low molecular weight material significantly diffuses throughout the film and remains distributed in a non uniform fashion across the film from the first surface to the second surface;

wherein light having a first polarization and a broad bandwidth incident on the first surface is substantially reflected from the film, and wherein light having a second polarization and the broad bandwidth incident on the first surface is not substantially reflected from the film, wherein an electric field impressed in the film substantially decreases the reflection of light of the first polarization and broad bandwidth, and wherein the step of crosslinking takes place in a time $t_1$, long compared to the time $t_2$ in which the low molecular weight material can significantly diffuse.

16. The method of claim 15, wherein the step of crosslinking takes place includes irradiation of the film by low intensity ultraviolet radiation.

17. The method of claim 16, wherein the step of crosslinking takes place includes irradiation of the film by high intensity ultraviolet radiation having a radiation intensity of less than 1 mw/cm$^2$.

18. The method of claim 15, wherein the step of crosslinking takes place includes irradiation of the film by high energy electrons where the electron where the electron energy deposition varies substantially throughout the film.

19. The method of claim 15, wherein the step of crosslinking takes place includes irradiation of the film by light which is substantially nonuniformly absorbed throughout the film.

20. The method of claim 15, wherein the step of crosslinking takes place includes heating the film substantially nonuniformly across the film.

* * * * *